April 9, 1968  G. SCHÖLL  3,377,047
ROTARY GATE VALVE FOR FLUID CHANNELS
Filed June 22, 1965  2 Sheets-Sheet 1
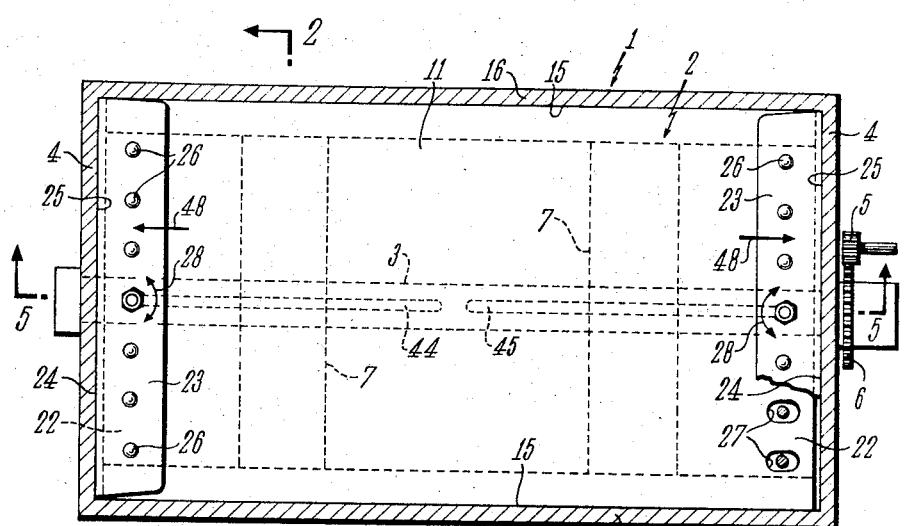
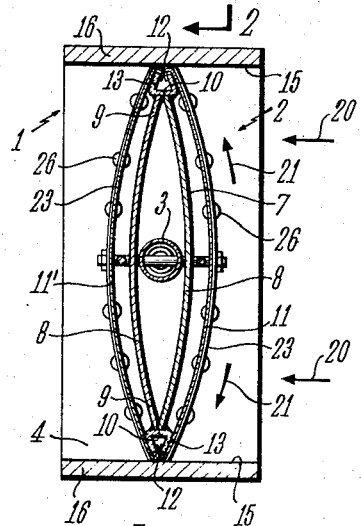
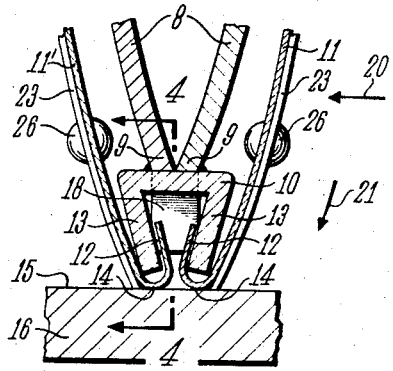
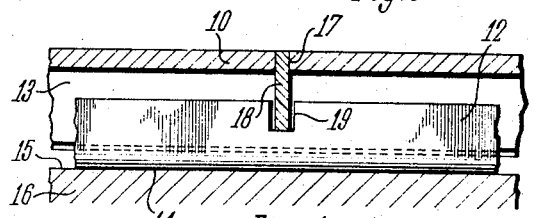
Günter Schöll
INVENTOR
BY  Ross & Mestern April 9, 1968  G. SCHÖLL  3,377,047
ROTARY GATE VALVE FOR FLUID CHANNELS
Filed June 22, 1965  2 Sheets-Sheet 2
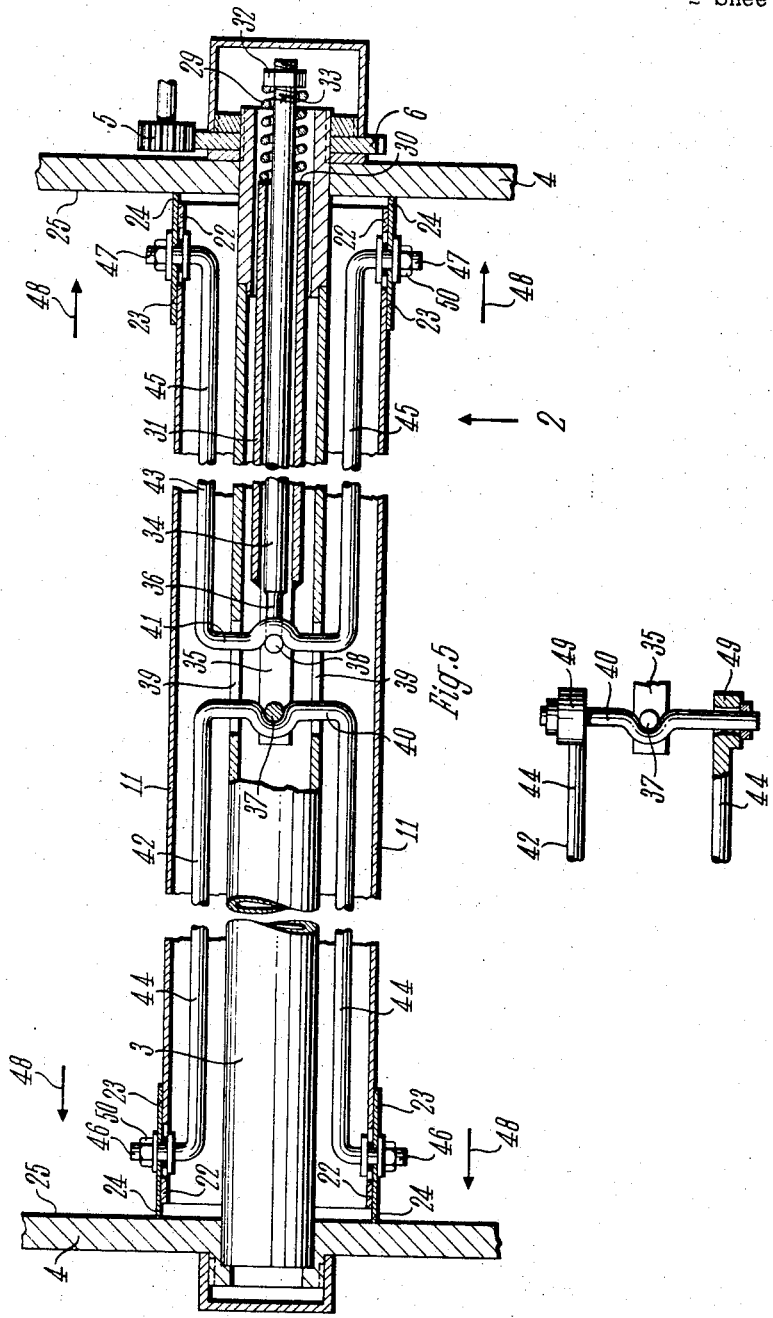
Günter Schöll
INVENTOR
BY Ross & Mestern United States Patent Office 3,377,047
Patented Apr. 9, 1968

3,377,047
ROTARY GATE VALVE FOR FLUID CHANNELS
Günter Schöll, Mulbergerstrasse 21a,
Esslingen (Neckar), Germany
Filed June 22, 1965, Ser. No. 465,986
Claims priority, application Germany, June 26, 1964,
Sch 35,390
14 Claims. (Cl. 251—175)

ABSTRACT OF THE DISCLOSURE

Rotary gate valve for the selective closure of a channel of rectangular cross section, with a shaft journaled in two of the channel walls for rotation about an axis parallel to the two other channel walls and a pair of outwardly bulging valve plates mounted back-to-back on the shaft for rotation therewith, the ends of each valve plate being fitted with sliders which are urged outwardly by a spring to bear upon the shaft-supporting channel walls.

The present invention relates to a rotary gate valve which is rotatably or pivotably mounted within a fluid channel, for example, an air or flue-gas channel or a channel of a regenerative heat exchanger, and is adapted when closed to shut off the entire cross-sectional area of the channel.

For opening and closing air and flue-gas channels it is known for a long time to employ slidable gate valves which generally consist of two plates, one of which is slidable relative to the other which is mounted in a fixed position. These two slide plates are provided with apertures which in the open position of the movable plate are in alignment with each other so as to allow the air or gas to flow therethrough, while in the closed position of this plate the apertures in the two plates are offset relative to each other so that the solid parts intermediate the apertures in one plate cover the apertures in the other plate.

It is also known to provide such channels with rotary gate valves which when pivoted to their open position about their central axis extend parallel to the longitudinal axis of the channel, while when pivoted to their closed position they extend vertically to the channel axis and their longitudinal edges which extend parallel to their pivot axis then engage tightly with the inner surfaces of the opposite horizontal walls of the channel.

If such slide valves or the rotary valves of the type described above are installed in channels through which hot and cold fluids are alternately conducted, as occurs especially in regenerative heat exchangers, the particular difficulty arises that, because of the varying temperatures of the fluids passing through the channels, the slide plates or the rotary valve plates will alternately expand and contract, while the thicker walls of the channels and also the solid supporting frames of the slidable or rotary gate valves because of their larger mass and greater heat-retaining capacity will not follow the thermal expansions and contractions of the gate valves but take up a medium temperature. Consequently, the slide plates of the slidable gate valves and also the pivotable plates of the rotary gate valves become distorted relative to their frames, which, in turn, has the result that the gate valves either become tightly locked or do not close sufficiently.

In order to protect a rotary gate valve of known type from such excessive thermal effects and to prevent it from being locked in the closed position, efforts have already been made to abstract as quickly as possible the heat to which the valve is subjected, for example, by hot gases within the channels, by means of a liquid cooling medium which also produces an equalization of temperature and thus a substantially constant temperature of the rotary valve.

There exists another known type of rotary gate valve which is provided on both sides with radiating plates which are intended to reflect the heat supplied thereto. These radiating plates together with the valve enclose a pair of chambers which communicate with each other through apertures provided in the walls of the valve. Since only one of the two radiating plates which cover the rotary valve is ever acted upon by the hot gas or other fluid within the channel, only one of these two chambers will ever be heated. This necessarily results in a circulating air current and thus in a heat exchange between the two adjacent chambers. Although this may be a more simple and reliable procedure than that of cooling a rotary gate valve by means of a liquid cooling medium, the effect of such radiating plates and also of such an internal heat exchange is very small and by no means sufficient to eliminate the danger that the valve may either become locked when in the closed position or not close the channel tightly.

While the gate valves above described were designed so as to dissipate or abstract as quickly as possible the heat of the gases or other fluids to which the valve is subjected and thereby also to avoid thermal stresses as much as possible, it is the object of the present invention to provide a rotary gate valve which may freely expand and contract under the effect of hot or cold fluids contained within the channel and acting upon one side of the closed valve without any danger that the valve may then either become locked or not close the channel tightly.

For attaining this object, the invention provides that a rotary valve for tightly closing the full cross-sectional area of a channel consists of at least one arcuately curved resilient plate which is mounted centrally of its curved side by suitable supporting means on a rotatable shaft which extends transversely through the channel. When turned to its closing position within the channel in which its convex outer surface faces in the direction of the channel section containing a higher pressure than the channel section at the other side of the valve, this curved plate is acted upon by the pressure of the fluid within the channel which tends to straighten the plate so that its effective width, as seen in a direction at right angles to the axis of the valve shaft, is thereby increased and its sealing edges which extend parallel to the axis of the valve shaft will bear tightly upon the inner surfaces of the opposite walls of the channel, which are hereafter called the horizontal walls, and thereby also seal the channel tightly. This design of the rotary valve therefore by no means prevents a thermal expansion of the material but insures that, despite such a thermal expansion and a subsequent contraction of the valve, this valve will never become locked in its closed position and will also close the channel tightly.

Owing to the arcuate shape of the valve plate and by virtue of its resilience and the inclination of its sealing edges, the present invention permits the specific pressure exerted by the gas or other fluid upon the valve plate to be transmitted by the sealing edges of this plate to the channel walls at an increased ratio from 100:1 to 500:1. Furthermore, since the sealing pressure exerted by the sealing edges of the valve plate upon the channel walls increases in proportion with any increase in the pressure exerted by the fluid upon the plate, it is evident that the sealing action will at all times be of the proper strength to seal the channel tightly regardless of how strong the pressure of the fluid might be.

Since the deformation of the arcuate valve plate due to the fluid pressure only occurs within the elastic limits of the material of the valve plate, this plate will always return to its original, more highly curved shape when the pressure upon the plate decreases. The deformation of the valve plate therefore occurs entirely independently of temperature changes, such as occur especially in regenerative heat exchangers, and does not depend upon any particular resiliency of the valve plate which could rapidly diminish or disappear entirely in the presence of high temperatures; thus, the valve plate according to the invention is far superior to one which is made of a spring material.

If the rotary gate valve should be designed so as to be capable of shutting off a particular channel in either direction of flow of a fluid therethrough, the valve preferably consists of two plates which are curved in opposite directions and are mounted on the same shaft which is normally disposed centrally between the two plates and also centrally between the parallel longitudinal sealing edges of each plate. When the valve is then turned to its closed position, the channel will be closed tightly by the expansion of either one or the other valve plate depending upon the direction of the pressure of the fluid which acts upon the valve.

According to a very advantageous construction of the rotary gate valve according to the invention, each of the longitudinal edges of each valve plate which extend parallel to the valve shaft is bent over backwards around a supporting element which preferably extends continuously from one lateral end of the valve plate to the other and is secured by suitable means to the valve shaft. The rounded backs of the bent-over edges of the plates then form relatively large sealing surfaces which, when the valve is in its closed position, engage with the inner horizontal wall surfaces of the channel and reduce any possible leaks to a minimum. These round sealing edges also have the advantage that they will not dig into the wall surfaces of the channel despite the pressure which they exert thereon, but will slide along the same relatively easily when the valve shaft is turned to move the valve from its open to its closed position and vice versa.

Each supporting element for the adjacent bent-over longitudinal edges of the two valve plates preferably consists of a crossbar of a substantially U-shaped cross section, the two webs for which serve as supports of the longitudinal edge portions of the valve plates at each side of the valve shaft which are bent from the outside over the free outer ends of these webs into the space between the webs.

In order to prevent the valve plates from shifting longitudinally along these crossbars, it may be advisable to provide the crossbars with suitable locking members or stops engaging the edge portions of the valve plates which are bent inwardly between the webs of each crossbar. These webs may, for example, be provided with notches to which the locking members engage with a certain amount of play.

While the structure previously described insures that the longitudinal edges of the valve plates will tightly engage the first or horizontal walls of the channel, provision must also be made to insure that the traverse edges of the valve plates will also tightly engage the second or vertical channel walls so that, when the valve is in its closed position, there will be no gaps between the valve plates and any of the walls of the channel and the latter will thus be tightly closed. For this purpose, the invention provides each lateral edge portion of each valve plate with a slide plate which extends transversely from one longitudinal edge of each valve plate to the opposite edge and is movable in a direction parallel to the valve shaft and adapted to bear resiliently at all times with its outer edge upon the adjacent vertical wall of the channel. These slide plates may be connected to the lateral edge portions of the valve plates, e.g. by means of bolts, rivets or the like which pass through the valve plates by way of slots extending in a direction parallel to the valve shaft and having a width slightly larger than the diameter of the bolts or the like so as to enable each slide plate not only to move parallel to the axis of the valve shaft but also to pivot to a certain extent about an axis which extends perpendicularly to the slide plate. This construction enables the slide plates to adapt themselves to the opposite vertical wall surfaces of the channel so as to bear tightly thereon even if these wall surfaces do not extend exactly parallel to each other or exactly at right angles to the horizontal channel walls.

The spring means for pressing the slide plates against the vertical walls of the channel consist according to a preferred and very simple embodiment of the invention of a single coil spring which acts upon all the slide plates. In order to protect this spring from the high temperatures and also from the changing temperatures within the channel so as to prevent it from weakening by fatigue, the spring is preferably mounted at a location outside the channel and is then connected to the two pairs of slide plates by suitable connecting means. In the event that the valve shaft is of tubular shape, these connecting means may consist, for example, of a tubular member which is movable longitudinally within the valve shaft, and of a draw rod which, in turn, is movable longitudinally within this tubular member. The outer ends of this tubular member and also of this draw rod are acted upon by the opposite ends of the coil spring which thus tends to move these two parts in opposite directions. The inner ends of the tubular member and the draw rod are then connected by U-shaped brackets to the two pairs of slide plates so that each pair is pressed in the opposite direction to the other pair and thus tightly against the adjacent vertical wall of the channel. Since the tubular member and the draw rod are located inside the tubular valve shaft, the latter is provided with longitudinal slots through which the crossbars of these U-shaped brackets extend, while the parallel arms of each of these brackets then extend along the inside of the main valve plates, and the ends of these arms are connected to the slide plates.

In order to permit the two slide plates on each side of the two main valve plates also to shift relative to each other so as to compensate for the different expansion of the two valve plates and also of these slide plates, the invention further provides that the crossbar and the two parallel arms of each U-shaped connecting bracket may form separate elements which are connected to each other by flexible joints.

The various features and advantages of the present invention will become more clearly apparent from the following detailed description of a preferred embodiment thereof, given with reference to the accompanying drawing in which:

FIG. 1 shows a cross section of a flow channel with a rotary gate valve therein in its closed position;

FIG. 2 shows a cross section which is taken along the line 2—2 of FIGURE 1;

FIG. 3 shows an enlarged view of a part of the section according to FIG. 2;

FIG. 4 shows a cross section which is taken along the line 4—4 of FIG. 3;

FIG. 5 shows an enlarged longitudinal section of the rotary gate valve which is taken along the line 5—5 of FIG. 1; while FIG. 6 shows a detail view of a modification of a connecting bracket as shown in FIG. 5.

In the drawing FIG. 1 shows a cross section of a flow channel 1 in which a rotary gate valve 2 is mounted which is indicated as being in its closed position. The central shaft 3 of valve 2 is of a tubular shape and rotatably mounted at both ends in the two vertical walls 4 of channel 1 and is adapted to be rotated by a gear 6 which is secured to one end of shaft 3 and is driven by a pinion 5 which is connected to suitable driving means. The tubular shaft is further provided with a pair of parallel crossarms 7, each of which consists of a pair of straps 8 which are welded at their centers to the outer surface of shaft 3, while the outer ends 9 of these straps abut against each other. These ends 9 of straps 8 are secured to longitudinal bars or beams 10 of a substantially U-shaped cross section which extend along the entire length of valve 2 and have an outwardly open channeled profile bounded by a pair of webs 13. At the outer sides of these arms 7, a pair of thin and therefore elastic arcuate plates 11 and 11' are mounted back-to-back with confronting concave sides so as to be outwardly convex, these valve plates having a length slightly smaller than the distance between the vertical walls 4 of channel 1. The longitudinal outer edges 12 of these plates 11 and 11' are bent over inwardly around the free ends of the lateral webs 13 of the crossbars 10 which are closely spaced from the opposite channel walls 16 when the elastic plates 11 and 11' are in their closing position and the plate support 3, 7, 10 stands upright as illustrated in FIGS. 1 to 3, the round outer edges 14 of these plates then bearing upon the inner surfaces 15 of the walls 16.

In order to secure the plates 11 and 11' in a fixed axial position relative to the beams 10, at least one of the crossbars 10 is provided with a slot 17, as shown in FIG. 4, through which a locking strip 18 is inserted from the inside. This locking strip, in turn, engages with lateral play in a slot 19 which is provided in one longitudinal edge 12 of each of the plates 11 and 11'.

If a fluid contained in the channel 1 exerts a pressure in the direction of the arrows 20 upon the curved valve plate 11, this plate 11 is bent toward a straighter position so that the distance between its outer edges 14 increases and these edges are pressed firmly in the direction of the arrows 21 against the inner surfaces 15 of the channel walls 16. The other plate 11', however, which is not acted upon by the pressure of the fluid remains in its highly curved inactive position. Since the pressure which plate 11 exerts in the direction of the arrows 21 against the inner surfaces 15 of the channel walls 16 is in proportion to the pressure which the fluid exerts upon this plate in the direction of the arrows 20, an increase in fluid pressure also results in an increase in the pressure of the outer edges 14 of plate 11 against the inner surfaces 15 of the channel walls 16. It is therefore evident that the channel will be tightly closed regardless of how strong the fluid pressure might be.

If the valve 2 is turned in either direction through an angle of 90° to its open position, the pressure of the fluid upon the plate 11 decreases so that, owing to its inherent resilience, it will then return to its original strongly curved position. If a fluid thereafter flows in the opposite direction through the channel 1 and valve 2 is again turned to its closed position, the fluid then exerts a pressure upon the other plate 11' and thereby expands this plate in the same manner as previously described so as to close the channel. Consequently, regardless of whether the fluid flows through the channel 1 in one or the other direction, only one of the two plates 11 and 11' of valve 2 will tightly close the channel, while the other plate will be loosely suspended on the respective webs 13 of the crossbars 10.

As further illustrated in FIG. 1, the lateral outer end portions 22 of plates 11 and 11' are provided with relatively slidable end plates 23 which are movable in a direction parallel to the axis of the valve shaft 3 and whose outer edges 24 bear tightly upon the inner surfaces 25 of the two lateral walls 4 of channel 1, while the outer ends of these edges 24 engage with the ends of the horizontal channel walls 16. These slide plates 23 are connected to the lateral outer end portions 22 of plates 11 and 11' by means of rivets 26 which extend through elongated or slots 27 in the plates 11 and 11' and have a diameter which is so much smaller than the width of holes or cutouts 27 that the slide plates 23 may not only slide in the longitudinal direction of the holes 27 but also carry out a small pivoting movement in the direction of the arrows 28.

In order to insure a tight engagement all of the slide plates 23 with the inner surfaces 25 of the side walls 4 of channel 1, a single coil spring 29 is provided which bears at one end upon the end surface 30 of a tubular member 31 which is movable longitudinally within the tubular shaft 3, while its other end engages a nut 32 which is screwed upon the outer end 33 of a draw rod 34 movable longitudinally within and relative to the tube 31. The inner end 35 of the tubular member 31 is longitudinally slotted and provided with a crosspin 37, while the inner end 36 of the draw rod 34 is provided with a hook 38. Crosspin 37 and hook 38 engage the curved central parts of the crossbars 40 and 41 of a pair of U-shaped brackets or yokes 42 and 43. These crossbars 40 and 41 extend through opposite longitudinal slots 39 in the wall of the tubular shaft 3, and the longitudinal arms 44 and 45 of the yoke-shaped members 42 and 43 extend along the inner sides of the valve plates 11 while their outer ends 46 and 47 are bent outwardly and extend through elongated holes in the valve plates 11 and centrally through each pair of slide plates 23. Locknuts 50 on the outer ends 46 and 47 prevent these ends from disengaging themselves from the slide plates 23. By virtue of this construction, biasing spring 29 is located outside the area which might be affected by the temperature of the fluid contained within or flowing through the channel 1 and acts through the two telescoped elements within the tubular shaft 3, i.e. the tube 31 and the draw rod 34, upon both brackets 42 and 43 which are thereby pressed in opposite directions as shown by the arrows 48 and, in turn, press the edges 24 of the slide plates 23 firmly against the inner surfaces 25 of the side walls 4 so that these sides of the channel are likewise tightly sealed by the rotary gate valve.

In the event that it is desirable to produce a differential movement of the slide plates 23 in the direction of the arrows 48, the crossbars 40 and 41 of brackets 42 and 43 may form separate elements, as shown in FIG. 6, which are connected by flexible joints 49 to the lateral arms 44 and 45 of the two brackets and thus permit these two arms of each bracket to shift relative to each other so that the slide plates 23 will automatically adapt themselves to the side walls 4 of the channel to compensate for the different expansion and contraction of the valve plates 11 and 11' and the slide plates 23 thereon.

From the foregoing description it is evident that the main valve plates 11 and the slide plates 23 may expand or contract under the effects of a high or low temperature of the fluid in channel 1 without any danger that the gate valve might thereby either become wedged between the walls of the channel or not produce a tight sealing action on these walls. A series of tests which have been made with a rotary gate valve according to the invention have shown that, even at greatly varying temperatures, any gaps which might still remain when the gate valve is closed have a size of 0.1 mm. or less.

While in the previous description the channel walls 4 and 16 have been described with reference to the drawing as being vertical and horizontal walls, they may, of course, also extend in any other direction, although at right angles to each other. Furthermore, these walls 4 and 16 do not need to form the walls of the channel itself, but may form the walls of a frame in which the rotary valve according to the invention is mounted and which together with the valve may then form a structural unit which may be easily installed in a channel of a corresponding cross-sectional size.

Although my invention has been illustrated and described with reference to a preferred embodiment thereof, I wish to have it understood that it is in no way limited to the details of such embodiment but is capable of numerous modifications within the scope of the appended claims.

Having thus fully disclosed my invention, I claim:

1. A rotary gate valve for opening and closing a fluid channel having a generally rectangular cross section with a pair of opposite first walls and a pair of opposite second walls, said valve comprising a support in said channel rotatably about an axis parallel to said first walls and perpendicular to said second walls, a thin and elastic arcuate valve plate on said support having a length substantially equal to the distance between said second walls and having a pair of sealing edges on opposite sides of and parallel to said axis, said valve plate being convex toward a source of fluid under pressure upon said support occupying a closed position in which said sealing edges contact said first walls whereby said pressure tends to straighten said valve plate and to press said sealing edges tightly against said first walls, a pair of end plates slidably connected with said valve plate adjacent said second walls for movement in a direction parallel to said axis, and mechanism for urging said end plates into sealing engagement with said second walls.

2. A valve as defined in claim 1 wherein the ends of said valve plate adjacent said second walls are provided with cutouts and said end plates are provided with fastening means traversing said cutouts with play enabling limited shifting and swinging of said end plates relative to said valve plate.

3. A valve as defined in claim 1 wherein said mechanism includes a biasing spring common to both said end plates.

4. A valve as defined in claim 3 wherein said mechanism further includes a pair of link members respectively connected with said end plates and a pair of telescoped elements respectively joined to said link members and extending in the direction of said axis, said spring being anchored to said telescoped elements for urging said end plates away from each other.

5. A valve as defined in claim 4 wherein said telescoped elements extend outwardly along said axis beyond one of said second walls, said spring being disposed outside said channel.

6. A rotary gate valve for opening and closing a fluid channel having a generally rectangular cross section with a pair of opposite first walls and a pair of opposite second walls, said valve comprising a support in said channel rotatably about an axis parallel to said first walls and perpendicular to said second walls, and a thin and elastic arcuate valve plate on said support having a length substantially equal to the distance between said second walls and having a pair of sealing edges on opposite sides of and parallel to said axis, said valve plate being convex toward a source of fluid under pressure upon said support occupying a closed position in which said sealing edges contact said first walls whereby said pressure tends to straighten said valve plate and to press said sealing edges tightly against said first walls; said support including a shaft centered on said axis and journaled in said second walls, a pair of bars parallel to said shaft and substantially coextensive with said sealing edges, and at least one transverse member rigid with said shaft and with said bars, said bars having outer zones remote from said axis which in said closed position are closely spaced from said first walls, respectively, said sealing edges being formed by marginal portions of said valve plate bent around said outer zones with freedom of relative radial displacement between said valve plate and said bars.

7. A valve as defined in claim 6 wherein at least one of said bars and said valve plate are provided with interlocking formations for preventing said valve plate from shifting longitudinally of said bars.

8. A rotary gate valve for opening and closing a fluid channel having a generally rectangular cross section with a pair of opposite first walls and a pair of opposite second walls, said valve comprising a support in said channel rotatably about an axis parallel to said first walls and perpendicular to said second walls, and a pair of thin and elastic arcuate valve plates positioned back-to-back on said support with concave sides confronting each other, each of said valve plates having a length substantially equal to the distance between said second walls and having a pair of sealing edges on opposite sides of and parallel to said axis, said valve plates bulging in longitudinal direction of said channel upon said support occupying a closed position in which said sealing edges contact said first walls whereby pressure of a fluid in said channels tends to straighten at least one of said valve plates and to press said sealing edges thereof tightly against first walls; said support including a shaft centered on said axis and journaled in said second walls, a pair of bars parallel to said shaft and substantially coextensive with said sealing edges, and at least one transverse member rigid with said shaft and with said bars, each of said bars having an outwardly open channeled profile including a pair of webs which in said closed position are closely spaced from a respective one of said first walls, said sealing edges being formed by marginal portions of said valve plates bent around said webs with freedom of relative radial displacement between said valve plates and said bars.

9. A rotary gate valve for opening and closing a fluid channel having a generally rectangular cross section with a pair of opposite first walls and a pair of opposite second walls, said valve comprising a support in said channel rotatably about an axis parallel to said first walls and perpendicular to said second walls, a pair of thin and elastic arcuate valve plates positioned back-to-back on said support with concave sides confronting each other, each of said valve plates having a length substantially equal to the distance between said second walls and having a pair of sealing edges on opposite sides of and parallel to said axis, said valve plates bulging in longitudinal direction of said channel upon said support occupying a closed position in which said sealing edges contact said first walls whereby pressure of a fluid in said channel tends to straighten at least one of said valve plates and to press said sealing edges thereof tightly against said first walls, two end plates slidably connected with each of said valve plates adjacent said second walls for movement in a direction parallel to said axis, and mechanism for urging said end plates into sealing engagement with said second walls.

10. A valve as defined in claim 9 wherein said mechanism includes a pair of link members each engaging a respective pair of said end plates adjacent one of said second walls, and spring means coupled with said link members for urging said pairs of end plates away from each other.

11. A valve as defined in claim 10 wherein said mechanism further includes a pair of telescoped elements respectively joined to said link members and extending in the direction of said axis, said spring means being a single spring anchored to said telescoped elements.

12. A valve as defined in claim 11 wherein said support includes a tubular shaft centered on said axis and passing outwardly through one of said second walls, said telescoped elements being disposed within said shaft, said spring being located beyond said one of said second walls.

13. A valve as defined in claim 12 wherein said shaft is provided with a pair of opposite longitudinal slots, said link members being yoke-shaped and having crossbars received in said longitudinal slots, said telescoped elements including a draw rod engaging one of said crossbars under tension and a surrounding tube bearing upon the other of said crossbars under axial pressure.

14. A valve as defined in claim 13 wherein each of said link members has a pair of lateral arms separate from its crossbar and flexible joints connecting the latter with said lateral arms for permitting relative shifts of the associated end plates respectively joined to said lateral arms.

References Cited

UNITED STATES PATENTS

| 2,703,586 | 3/1955 | Asker | 251—306 X |
| 3,008,685 | 11/1961 | Rudden | 251—175 X |
| 3,075,738 | 1/1963 | Englund | 251—175 X |
| 3,194,269 | 7/1965 | Williams | 251—175 X |

WILLIAM F. O'DEA, *Primary Examiner.*

H. W. WEAKLEY, *Assistant Examiner.*